United States Patent [19]

Tokunaga

[11] 4,006,829
[45] Feb. 8, 1977

[54] TRANSFER UNIT IN A TRANSFER MACHINE

[75] Inventor: Yoshio Tokunaga, Kurume, Japan

[73] Assignee: Citizen Watch Co., Ltd., Tokyo, Japan

[22] Filed: Jan. 19, 1976

[21] Appl. No.: 650,018

[30] Foreign Application Priority Data

Apr. 15, 1975 Japan .............................. 50-45598

[52] U.S. Cl. ........................... 214/1 BB; 214/1 BD; 214/1 Q
[51] Int. Cl.² ........................................ B65G 25/04
[58] Field of Search ............... 29/200 A; 214/1 BB, 214/1 B, 1 BT, 1 Q, 1 BD, 1 BV

[56] References Cited

UNITED STATES PATENTS

| | | | |
|---|---|---|---|
| 2,980,266 | 4/1961 | Boros | 214/1 BB |
| 3,075,651 | 1/1963 | Kaden | 214/1 BB |
| 3,430,782 | 3/1969 | Henkel | 214/1 BB |
| 3,620,381 | 11/1971 | McCaughey | 214/1 BB |
| 3,655,070 | 4/1972 | Haydu | 214/1 BB |

*Primary Examiner*—Frank E. Werner
*Attorney, Agent, or Firm*—Spensley, Horn & Lubitz

[57] ABSTRACT

A transfer machine for transporting a work piece from one work station to another. The transfer machine comprises in combination a mounting table reciprocally movable in the transfer direction, a plurality of mounting blocks on the mounting table at the same interval as that of the working station, a cam operated chuck mounted traversely to the transfer direction on each mounting block, a cam shaft mounted in parallel with the working stations and carrying a plurality of cam plates, and a plurality of cam levers cooperating with the cam plates. When the cam shaft is rotated, the cam levers open and close the chucks, traversely move the chucks back and forth, elevate and lower the mounting table, and displace the work piece in the transfer direction.

7 Claims, 6 Drawing Figures

TRANSFER UNIT IN A TRANSFER MACHINE

FIELD OF INVENTION

This invention relates to a transfer unit or assembly and more particularly to a transfer machine provided with a number of similar working stations arranged in tandem and at a fixed interval between them.

DESCRIPTION OF PRIOR ART

It is frequently necessary when mass producing a product to utilize automatic machinery to perform the work upon the work piece being manufactured. As part of such automatic machinery, it is frequently necessary to supply a means for moving the work piece from work station to work station. Furthermore, since each work piece must not only be placed in the work station but also retrieved from the work station, the means for moving the work piece from work station to work station must also be capable of placing and picking up the work piece at the work station.

There exists in the prior art means for moving work pieces from work station to work station. Such means include conveyor belts and hydraulicly operated apparatus. Conveyor belts are unsuitable for the desired function because they are incapable by themselves of placing and picking up a work piece at a work station. While hydraulicly controlled apparatus is capable of performing the desired function, it is undesirably complex and usually requires complex routine adjustment.

In addition, there exists in the prior art a mechanical device having a cam. This device too has a technical difficulty in its operation. The difficulty is that a very precise adjustment of the center of the jig and the chuck and the transport distance between stations is required. Therefore, this device is only good in operation with a few work stations.

SUMMARY OF THE INVENTION

In keeping with the principles of the present invention, the objects are accomplished by a transfer unit comprising a mounting table movable intermittently in the work transport direction by a pitch equal to the interval between the adjacent work stations, and a plurality of mounting blocks arranged on the mounting table at the same interval as that of the working station and adapted for being slightly adjusted in their position in both vertical and transfer directions. A chuck shaft is provided in each of said mounting blocks in a direction normal to the reciprocating direction of the mounting table so as to be movable longitudinally. Each chuck shaft is fitted at its front end with a pair of movable chuck jaws that may be opened and closed with the translating or longitudinal movement of the chuck shaft. Guide means are provided for the chuck jaws for engaging with corresponding guide portions provided for a jig unit which is mounted to each work station. There is also provided a cam shaft which is on a parallel with the tandem arranged work stations. Said cam shaft carries a plurality of cam plates adapted for cooperation with cam levers mounted within the machine frame. Accordingly, when the cam shaft is rotated, the cam levers open and close the chuck jaws, displace the chuck shaft in both directions, elevate and lower the mounting block, and inermittently displace the work piece along the transfer direction.

In another embodiment of the present invention, there is provided a means for reversing the work topsy-turvy as the work piece is transported from one to the next working station. The means for reversing the work piece topsy-turvy is formed by a bushing rotatably mounted on each mounting block which is operable to hold the work piece so as to permit only a translating movement, a pinion mounted coaxially and integrally with the bushing, a tooth rack meshed with the pinion.

Accordingly, it is a general object of the present invention to provide a transfer unit which automatically moves the work piece from one work station to another.

It is another object of the present invention to provide a transfer unit which automatically places on and retrieves from the work station, the work piece.

It is still another object of the present invention to provide a simplified transfer unit.

It is yet another object of the present invention to provide a transfer unit that enables a chuck together with a mounting block to move vertically so as to place and pick up work pieces at the work station.

It is still another object of the present invention to provide a transfer unit which is capable of precisely setting the position of the chuck.

It is still another object of the present invention to provide a transfer unit which is capable of adjusting for any error in the setting of the position of the chuck and the jig.

It is yet another object of the present invention to provide a transfer unit which is capable of reversing the work pieces while being transported.

BRIEF DESCRIPTION OF THE DRAWINGS

The above mentioned and other features and objects of the present invention will become more apparent by reference to the following descriptions taken in conjunction with the accompanying drawings, wherein like reference numerals denote like elements, and in which.

DESCRIPTION OF THE PREFERRED EMBODIMENTS

Figure 1:
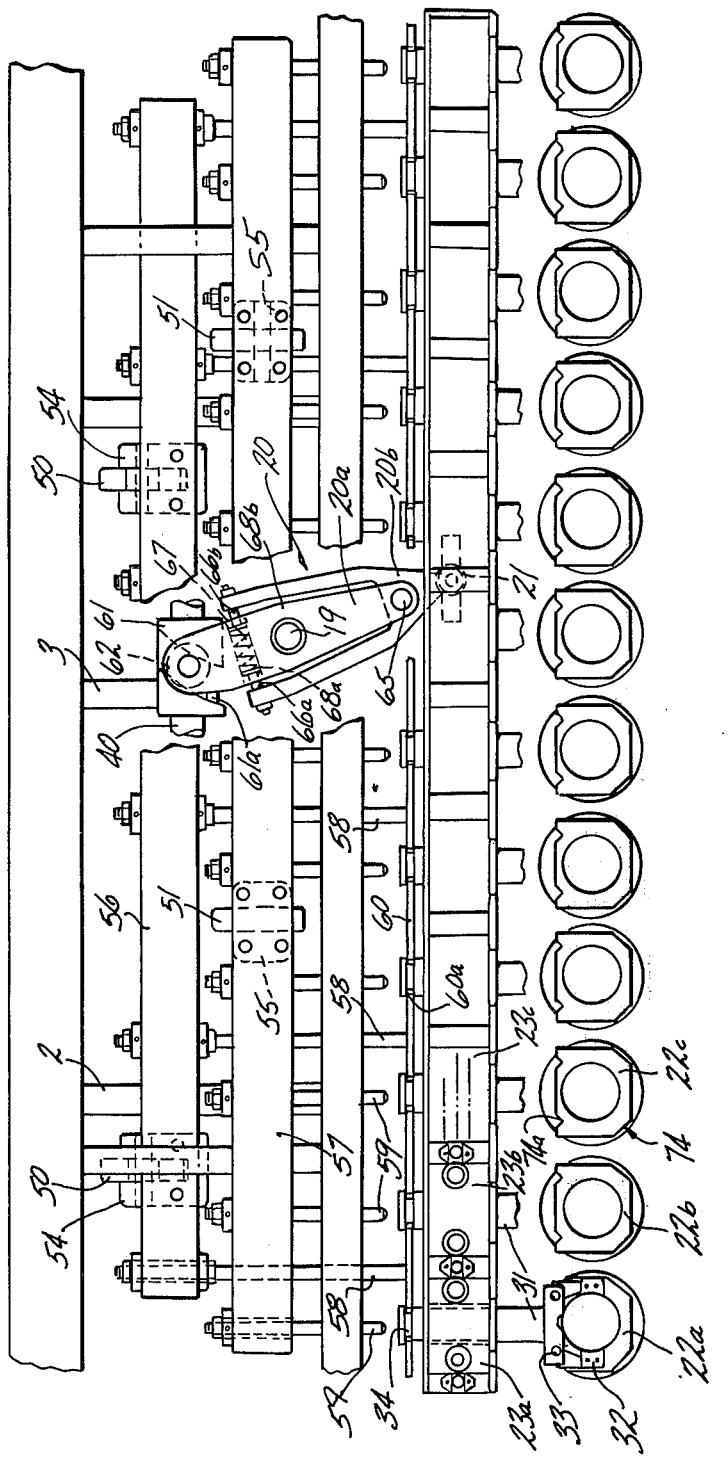
FIG. 1 is a plan view of one embodiment of the present invention.
Figure 2:
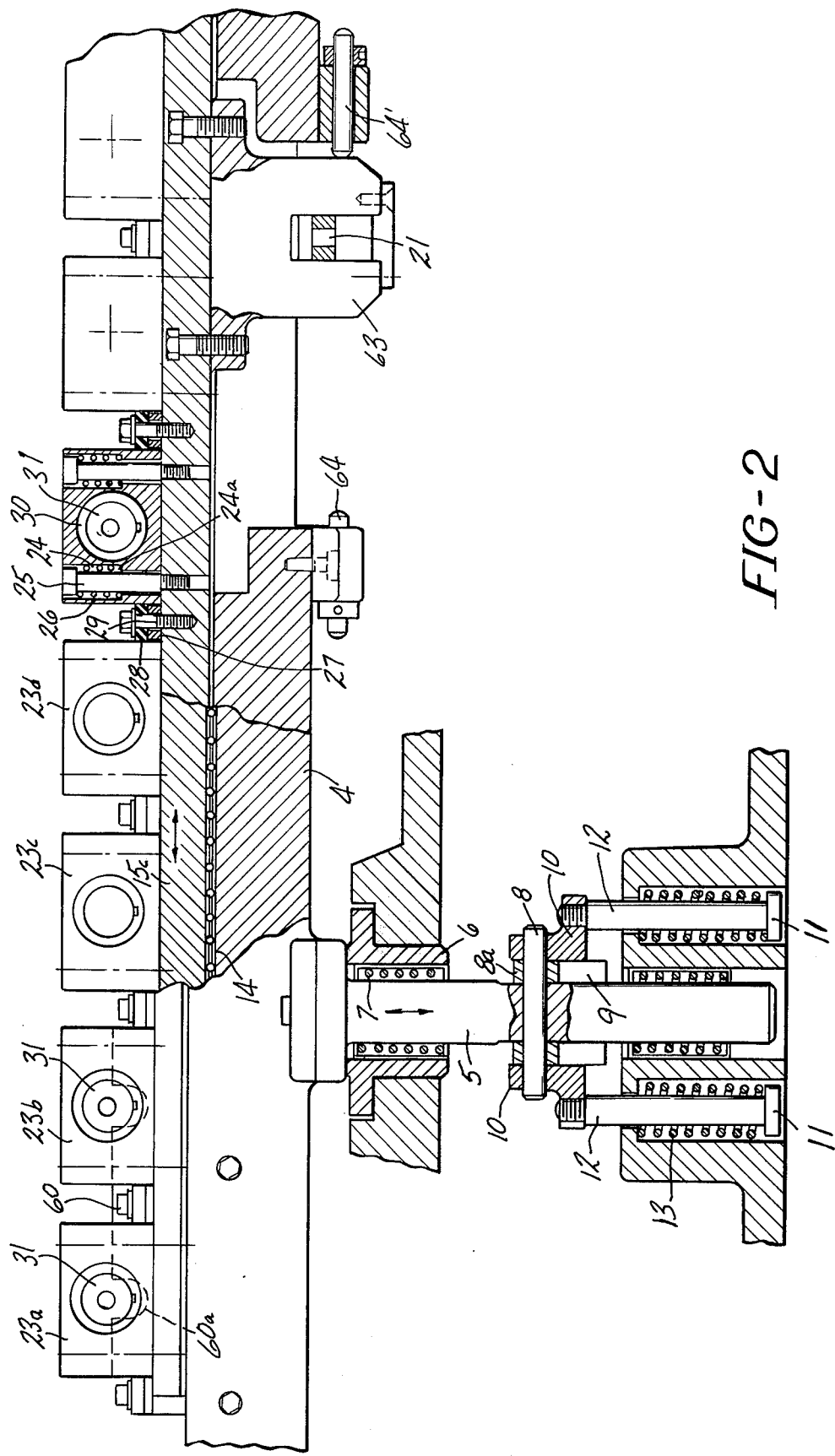
FIG. 2 is a front view, shown partly in section, of the embodiment of FIG. 1.
Figure 3:
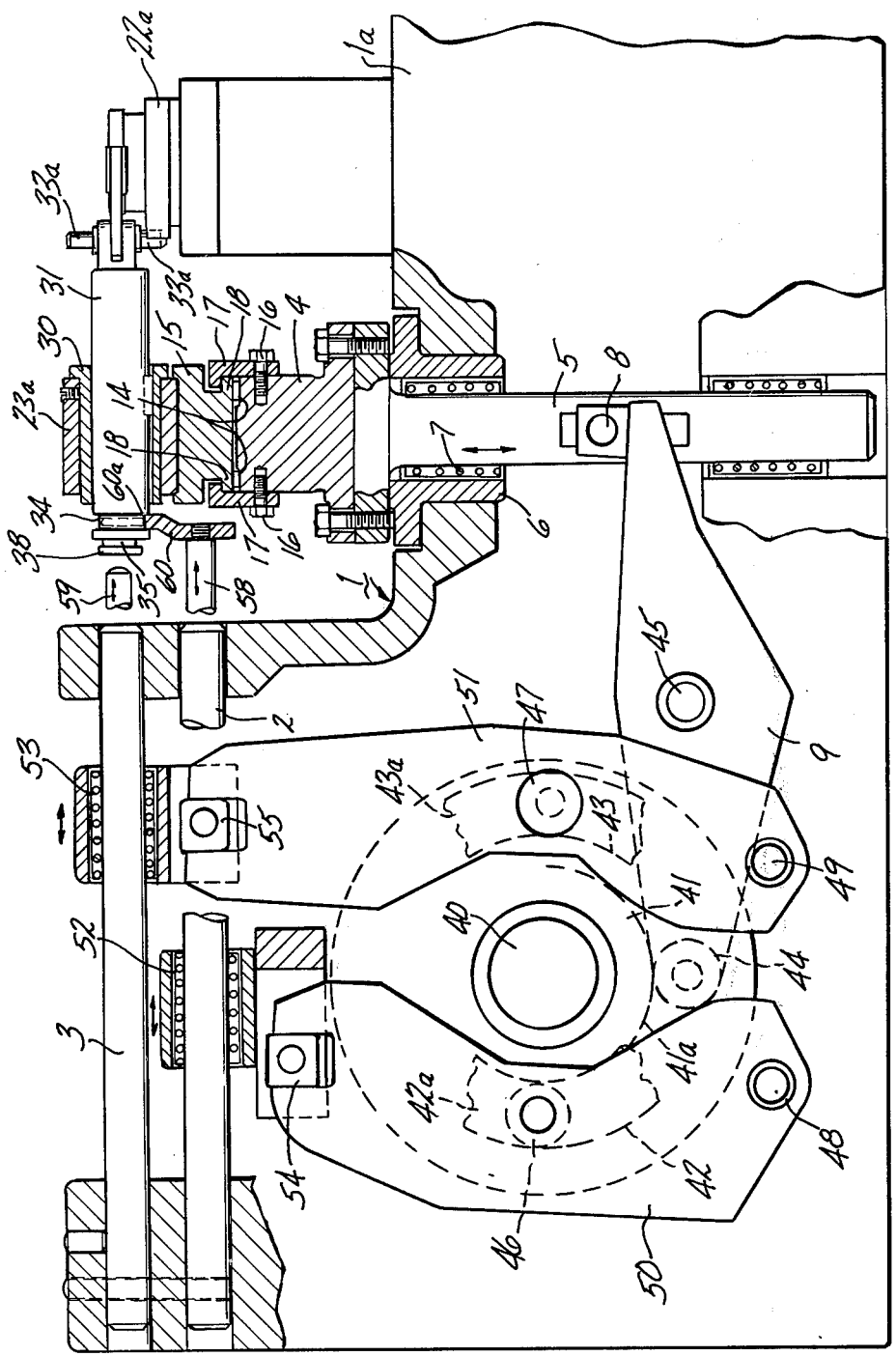
FIG. 3 is a side view, shown partly in section, of the embodiment of FIG. 1.

Referring to the drawings, FIGS. 1, 2, 3 and 4 illustrate one embodiment of the present invention. Machine frame 1, shown in FIG. 3, is provided at its front side with table 1a and carrying at its rear side two guide shafts 2 and 3 extending generally traversely to the transfer direction. On table 1a is mounted a mounting plate 4 carrying a plurality of vertical guide shafts 5 which pass through table 1a by means of ball bearing 7 provided in bearing blocks 6 and which may be moved vertically relative to table 1a. Each guide shaft 5 has a cross pin 8 carrying a rotary piece 8a on the lower surface which abuts one end of cam lever 9. Support piece 10 coupled to guide shaft 5 by cross pin 8 carries support pillars 12 which are provided with spring retainer 11 at their lower portion. Compression spring 13 biases guide shaft 5 downwardly as shown in FIG. 2. Mounting table 15 rides on ball bearings 14 on the upper surface of mounting plate 4 as shown in FIG. 3. Guide portions 18 on either side of mounting table 15 are slidably coupled to mounting plate 14 by guide rails 17 which are secured to mounting plate 4 by bolt 16. The mounting table 15 is also fitted with a stopper block 63, to be later described, for receiving end roller 21 of a forked lever assembly 20 which is connected to the machine frame 1 by an upright pin 19 in such a manner that the assembly 20 rotates around the pin 19.

A plurality of working stations 22a, 22b, . . . are mounted at equal intervals and in alignment with one another on table 1a. Similarly, the same number of mounting blocks 23a, 23b . . . are mounted on table 15 at the same intervals as that as the working stations 22a, 22b . . . on table 1a. Each mounting block 23a, 23b . . . is provided with a vertical through hole 24 (see FIG. 2) having a shoulder 24a for receiving a bolt 25 which is threadibly fixed to the mounting table 15. Coil spring 26 is mounted under compression between the head of bolt 25 and the shoulder 24a of through hole 24 for urging the mounting block downwards towards mounting table 15. Spacer 27 and resilient member 28 made of rubber of the like are arranged between each adjacent pair of mounting blocks and are fixed to mounting table 15 by bolt 29 as shown in FIG. 2. Accordingly, each mounting block can move slightly in the vertical direction under the effect of the compression spring and in the transfer direction due to small deformation of the resilient member 28. Each mounting block 23a, 23b, . . . is fitted with a bushing 30 into which is keyed chuck shaft 31 which is slidably movable along its axis and traversely with respect to the transfer direction.

Figure 4:
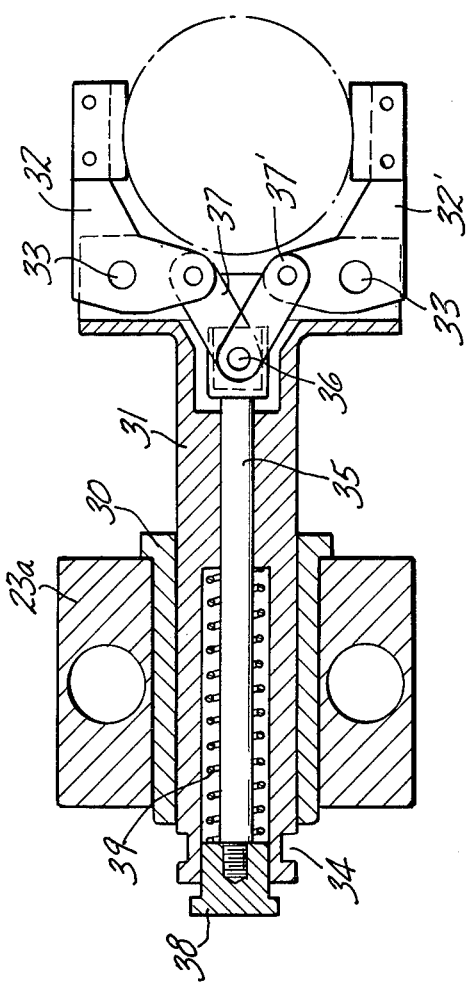
FIG. 4 is a plan view, shown in section, of the chuck shaft and related parts of the embodiment of FIG. 1.

As shown in FIG. 4, each chuck shaft 31 has a pair of movable chuck jaws 32 and 32' pivotally mounted thereto by pin 33 which protrude vertically from chuck jaws 32 and 32' as shown in FIG. 3 in the form of pin extensions 33a. Anular groove 34 is formed in the end of chuck shaft 31 which is opposite from the end having chuck jaws 32 and 32'. Operating arbor 35 is slidably mounted within a hollow shaft in chuck shaft 31. Links 37 and 37' are coupled at one end to operating arbor 35 by pin 36 and pivotally coupled at the other end to chuck jaws 32 and 32'. Abutment piece 38 is screwedly fitted to the opposite end of operating arbor 35 and is biased rearwardly by compression coil spring 39 mounted within chuck shaft 31.

Cam shaft 40 is provided within machine frame 1 and at the back of table 1a. Furthermore, cam shaft 40 is in parallel relation to mounting table 15 and carries at pre-determined intervals along cam shaft 40 cam plates 41, 42 and 43. These cam plates are shown only partially in the side elevation view of FIG. 3. Cam plate 41 has a cam surface 41a. Cam follower 44 abuts cam surface 41a and is pivotally mounted at one end of cam lever 9 which is fulcrumed in turn centrally by pin 45. Cam plates 42 and 43 are formed with cam grooves 42a and 43a for receiving cam followers 46 and 47 which are pivotally connected respectively to cam lever 50 and 51 which in turn are fulcrumed respectively by pins 48 and 49 and at their lower end thereof to some fixed portion of machine frame 1. The upper end of cam levers 50 and 51 are fitted with operating pieces 54 and 55 respectively which are mounted respectively on operating beams 56 and 57. Operating beams 56 and 57 are slidably carried in guide shaft 2 and 3 by means of bearing 52 and 53. One end of operating pin 58 is secured to operating beam 56 and one end of operating pin 59 is secured to operating beam 57. The opposite end of operating pin 58 is affixed to operating plate 60 which engages anular groove 34 formed in chuck shaft 31. Operating pin 59 is positioned in a confronting relation to the abutment piece 38 on the operating arbor 35 when the chuck shaft 31 is lowered in the manner described below.

As shown in FIG. 1, forked lever assembly 20 has a cam follower pin 62 disposed within a recess 61a of barrel cam 61 fitted on cam shaft 40. Forked lever assembly 20 is slidably coupled to mounting table 15 by the intermediary of stopper block 63 engaging with end roller 21 of the lever assembly as shown in FIG. 1 and FIG. 2. A pair of adjustment screws 64 and 64' are provided in mounting plate 4 for abutting stopper block 63 and adjusting the relative position of block 63. Lever assembly 20 comprises a first member 20a pivotally mounted by an upright pin 19 and carrying cam follower pin 62 and a second member 20b fulcrumed at 65 to the first member 20a and carrying end roller 21. Pin 66a and 66b are provided in second member 20b which extend traversely from second member 20b and in the swinging direction of lever assembly 20. Second member 20b is provided with spring retainer 68 and 68b and a compression coil spring 67 is mounted between spring retainer 66a and 66b so as to permit further swinging of the lever assembly 20 after lever assembly 20 has abutted against stopper block 63.

When cam shaft 40 is rotated, cam followers 44, 46 and 47 are actuated by their corresponding cam plates 41, 42 and 43 and cam levers 9, 50 and 51 are thereby driven into swinging motion. Accordingly, the transfer unit will operate in accordance with the operational sequence determined by the cam profile. Thus, operating pin 59 is moved towards table 1a by the operation of operating piece 55 and into pressure contact with abutment piece 38 thereby opening chuck jaws 32 and 32'. With abutment piece 38 thus held in pressure contact with operating pin 59, operating pin 58 comes into operation for advancing operating plate 60 and hence chuck shaft 31 towards the work piece until pin extension 33a engage with grooves 74a formed in jig plate 74. Accordingly the open chuck jaws 32 and 32' are advanced as far as the work piece placed on a work station and are placed positioned on either sides of the work piece. At this position, the operating piece 55 is retracted by the cam operation so as to release the pressure exerted on abutment piece 38 and thereby allowing chuck jaws 32 and 32' to grasp the work piece under the force of coil spring 39. Cam lever 9 is operated so as to elevate mounting plate 4 and mounting table 15. The work piece being thus lifted from the working station as it is grasped by chuck jaws 32 and 32'. Then, operating plate 60 recedes thereby moving the work piece away from jig 74. Lever assembly 20 is then swung with cam follower pin 62 travelling along the surface of groove 61a formed in barrel cam 61. As lever assembly 20 is swung mounting table 15 is slid on mounting plate 4 a distance equal to the interval between adjacent working stations. Operating plate 60 is advanced again until pin extensions 33a are engaged with grooves 74a of jig 74 provided at the next working station. Cam lever 9 then operates the lower mounting plate 4 and the mounting table 15 and the work piece is engaged with the jig and next working station while being held by chuck jaws 32 and 32'. With the work piece thus held at the next working station, chuck jaws 32 and 32' are opened to release the work and chuck shaft 31 is pulled next working station, chuck jaws 32 and 32' are open to release the work and chuck shaft 31 is pulled away from the work piece by the operation of operating plate 60. With the chuck shaft 31 elevated to a predetermined position, lever assembly 20 is actuated in the opposite direction for sliding the mounting table 15 on mounting plate 4 back to its former position. The chuck shaft is then lowered to a predetermined position to complete one transfer cycle.

Operating plate 60 has an upper edge formed with a number of U-shaped grooves 60a which are deeper than the predetermined vertical stroke of chuck shaft 31. Thus, the operating plate 60 may be retained permanently within the annular groove 34 of chuck shaft 31 during the sliding and vertical movement of mounting table 15 and mounting plate 4. Accordingly the operation of lever assembly 20 is not retarded by the above described movement as end roller 21 is moved in sliding engagement with block 63. As previously stated, mounting block 23a, 23b, . . . can be movable in their positions vertically and traversely to a small extent by virtue of the compression springs 26 and the resilient member 28.

Figure 5:
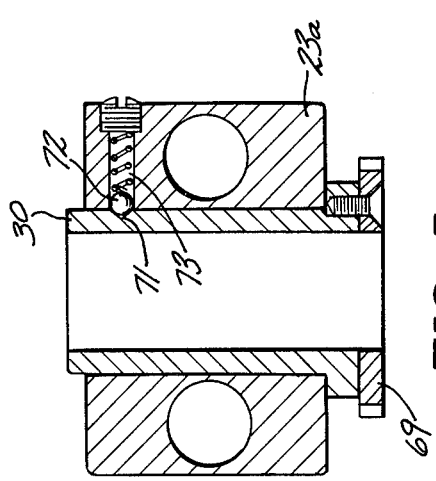
FIG. 5 is a plan view of another embodiment of the present invention wherein the work piece is inverted during transport between work stations.
Figure 6:
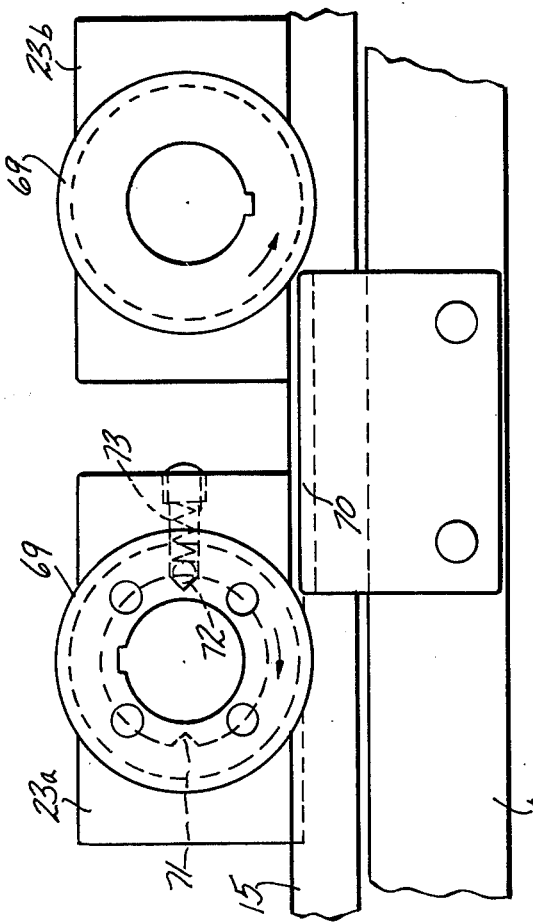
FIG. 6 is a front view of the embodiment of FIG. 5.

Referring to FIGS. 5 and 6, shown therein is another embodiment of the present invention. Bushing 30 rotatively mounted in each mounting block 23a, 23b, . . . which is to be modified to invert the work piece is provided with a pinion gear 69 cooperating with a rack 70 which is mounted on mounting plate 4. Rack 70 meshes with pinion 69 which in the course of the forward and reverse movement of mounting table 15 rotates the bushing 30 and thusly chuck shaft 31 keyed to bushing 30 through an angle of rotation equal to 180°. Thus, in the present embodiment, the work can be reversed in position as it is transferred from one to the next working station. Circumferential notches 71 are formed in bushing 30 at predetermined intervals for cooperating with a unit comprising a ball 72 and spring 73 provided in mounting block 23a, 23b . . . Such an arrangement provides a click stop means for positioning control of the work piece during the reversing operation. Furthermore, it is apparent to one skilled in the art that by fixing the length of the rack 70 and the spacing between mounting block 23a, 23b, . . . , bushing 30 may be rotated through any desired angle.

According to the present invention a desired number of transfer units are arranged in tandem and a cam shaft is associated with these transfer units by means of a coupling and the like. The present invention can thus be applied to the transfer of work pieces which require a number of machine operations. The chuck jaws are adapted to grasp the work from the sides so that a sufficient space may be created on top of the jig for operation of machine tools. Moreover, the transfer process of the work can be monitored from above the transfer machine.

In addition, according to the second embodiment of the present invention the chuck shaft can be rotated about its axis by device comprising of a bushing mounted on a block and a pinion mounted across with said bushing and matching with a tooth rack. By using this device, the work piece can be reversed in its position as it is transferred from one to the next working station. Furthermore, the work can be positioned accurately by engaging the jig unit with the guide portions provided in the chuck shaft.

In all cases it is understood that the above described embodiments are merely illustrative of one of many specific embodiments which can present applications of the principles of the present invention. Numerous and various other arrangements can be readily devised in accordance with these principles by those skilled in the art without departing from the scope of the invention.

I claim:

1. A transfer unit for a transfer machine provided with a number of working stations which are arranged in tandem at a fixed interval therebetween, said transfer machine being designed for transporting a work piece from one to the next working station for performing a series of operations on said work piece, comprising:
    a mounting table movable intermittently in the work transfer direction and in the opposite direction by a pitch equal to the interval between the adjacent working stations;
    a plurality of mounting blocks arranged on said mounting table at the same interval as that of said working stations and configured for being adjusted slightly in their positions in both vertical and transfer directions;
    a chuck shaft slidably coupled to each of said mounting blocks and movable along longitudinal axis of said chuck shaft, said chuck shaft being mounted traversely to said transfer direction and each said chuck shaft carrying at its front end a pair of chuck jaws;
    guide means provided on said chuck jaws and engageable with guide portions provided in turn on a jig unit mounted on each of said working stations;
    a mounting plate for reciprocally supporting said mounting table; and
    a cam shaft mounted in parallel with said tandem arranged working stations and carrying a plurality of cam plates which are adapted for cooperating with cam levers associated therewith, said cam levers being configured respectively for opening and closing the chuck jaws, longitudinally displacing said chuck shaft, elevating and lowering said mounting table and displacing said mounting table in the transfer direction.

2. The transfer unit according to claim 1 wherein said chuck shaft is hollow and an operating arbor is slidably in said hollow space of the chuck shaft so as to be movable therein longitudinally for opening and closing said pair of movable chuck jaws.

3. The transfer unit according to claim 2 wherein each of said mounting blocks is mounted on the mounting table by the intermediary of a resilient means, and elastically deformable element is interposed between the adjacent mounting blocks.

4. The transfer unit according to claim 2 further comprising means for rotating the position of work, said means comprising:
    a bushing rotatably mounted in each of said mounting blocks, said bushing being operative to hold said chuck shaft so as to permit only its longitudinal movement;
    a pinion formed coaxially and integrally with said bushing; and
    a toothed rack mounted on the mounting plate and configures for meshing with said pinion.

5. The transfer unit according to claim 2 wherein a first operating rod is operatively connected with each of said operating arbors and a first operating beam is fixedly mounted to said first operating rods so as to be movable parallel to the axis of said chuck shaft.

6. The transfer unit according to claim 5 wherein an operating plate is operatively connected with said chuck shafts for simultaneously displacing them towards and away from the work, said operating plate being operatively connected with second operating rods which are fixedly mounted to a second operating beam movable in turn parallel to the axis of each of said chuck shafts.

7. The transfer unit according to claim 6 wherein said cam shaft is driven in rotation for performance of such functions as closing and opening said chuck jaws, displacing said chuck shaft longitudinally, elevating and lowering said mounting plate and displacing said mounting table longitudinally.

\* \* \* \* \*